No. 865,416. PATENTED SEPT. 10, 1907.
I. MITCHELL.
TRACTION WHEEL.
APPLICATION FILED OCT. 15, 1906.

2 SHEETS—SHEET 1.

Witnesses

I. N. Mitchell
Inventor

By R. S. & A. B. Lacey,
Attorneys

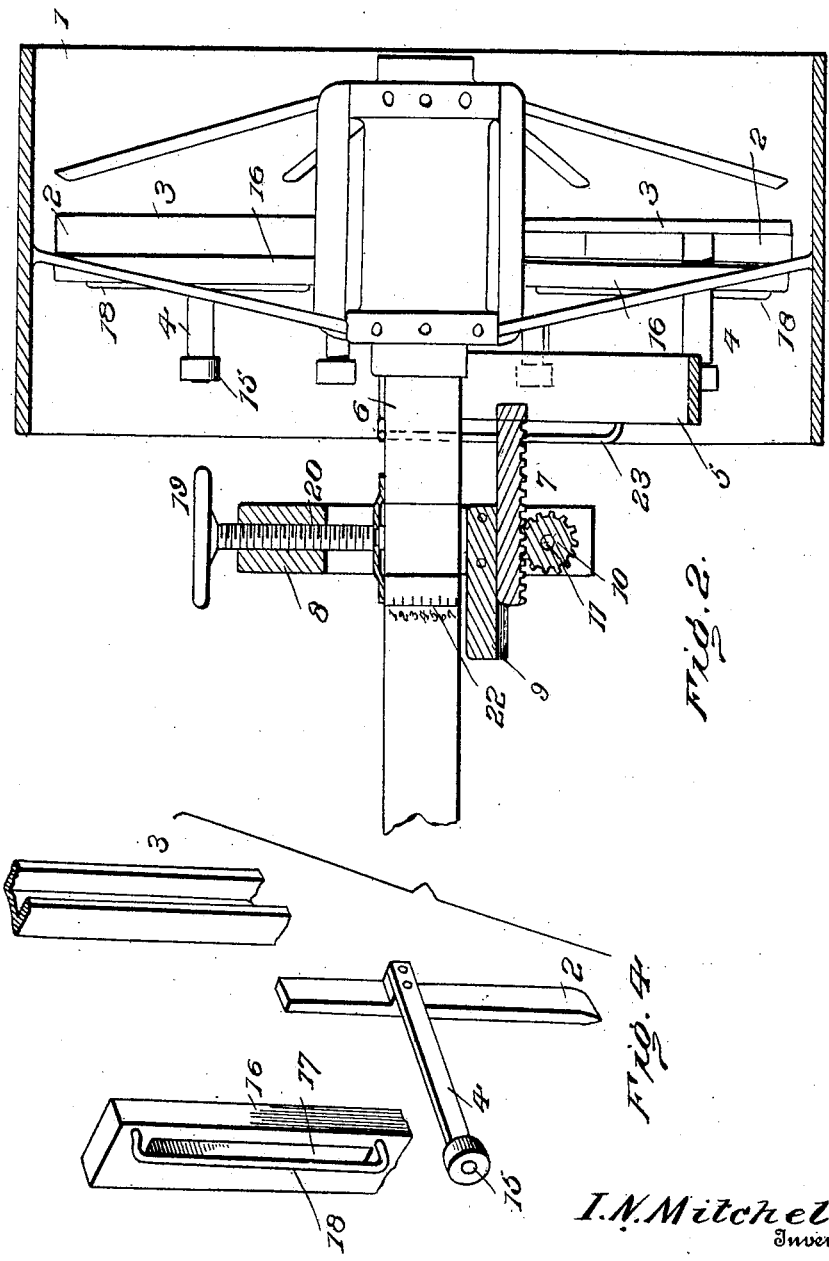

UNITED STATES PATENT OFFICE.

ISAIAH MITCHELL, OF BELL CITY, LOUISIANA.

TRACTION-WHEEL.

No. 865,416.  Specification of Letters Patent.  Patented Sept. 10, 1907.

Application filed October 15, 1906. Serial No. 339,055.

*To all whom it may concern:*

Be it known that I, ISAIAH N. MITCHELL, a citizen of the United States, residing at Bell City, in the parish of Calcasieu and State of Louisiana, have invented certain new and useful Improvements in Means for Operating Traction-Wheel Cogs, of which the following is a specification.

The present invention has relation to traction wheels of the variety provided with cogs adapted to be projected and retracted and aims to devise novel mountings and actuating means for the cogs, whereby they are positively moved outward and inward in the rotation of the wheel, the operating means embodying projecting and retracting tracks or cams, the former adapted to be thrown into and out of operative position by the operator at will.

For a full description of the invention and the merits thereof and also to acquire a knowledge of the details of construction of the means for effecting the result, reference is to be had to the following description and accompanying drawings.

Figure 1:
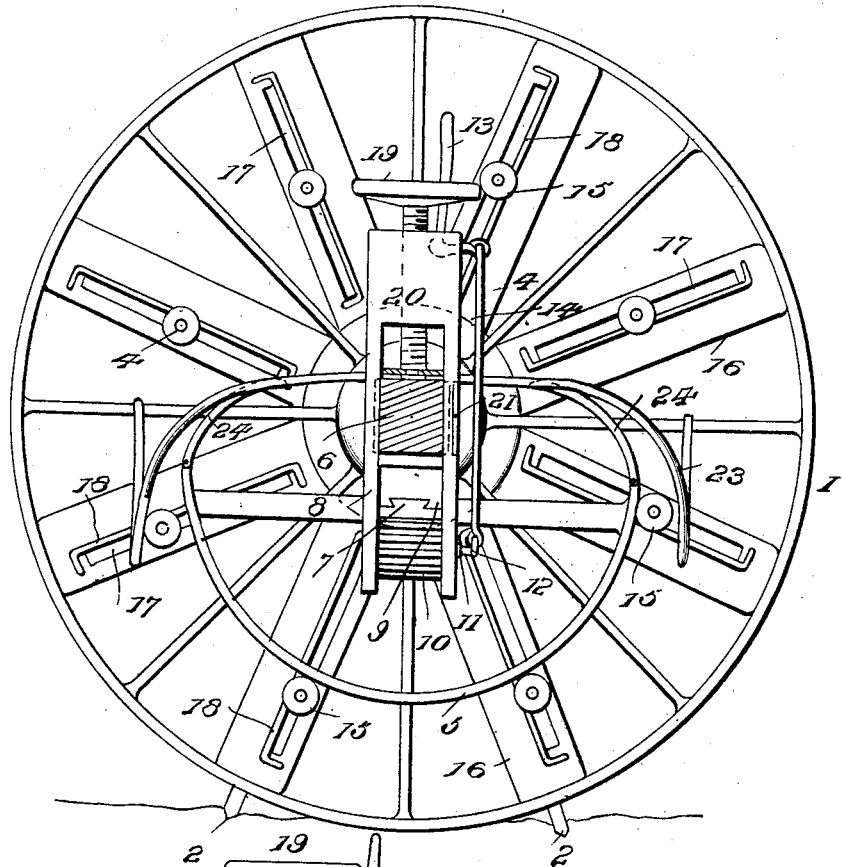
Figure 3:
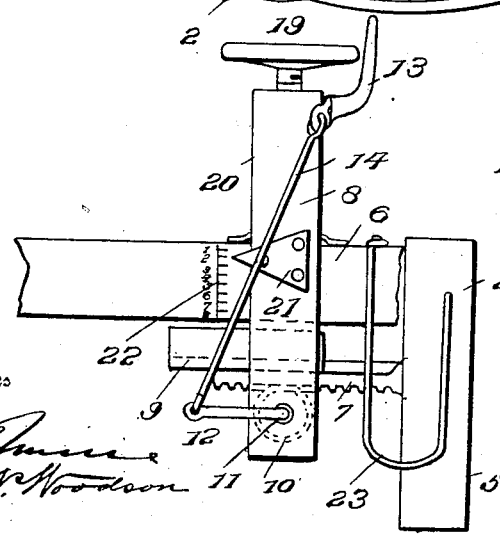

While the invention may be adapted to different forms and conditions by changes in the structure and minor details without departing from the spirit or essential features thereof, still the preferred embodiment is shown in the accompanying drawings, in which:

Figure 1 is a side view of a traction wheel showing the application of the invention. Fig. 2 is a vertical central transverse section of the traction wheel and the cog actuating mechanism. Fig. 3 is a detail view in elevation of the cog actuating means and the supports therefor. Fig. 4 is a detail perspective view of a cog and the guide coöperating therewith, the parts being separated.

Corresponding and like parts are referred to in the following description and indicated in all the views of the drawings by the same reference characters.

The traction wheel 1 may be of any design or make and is supplied with movable cogs 2 mounted so as to be projected beyond the tread surface of the wheel and to be retracted so as not to extend beyond the tread surface. In the construction illustrated, the movable cogs 2 consist of bars which are slidably mounted in guides 3, the latter being secured in any substantial way to the wheel. The guides 3 are hollow and are open at one side through which the cogs are exposed, the open sides making provision for operation of the arms 4 projected from the movable cogs and extending into the path of the operating tracks. The cogs 2 have a snug fit in the guides and the outer ends of the latter serve as scrapers to remove any mud or foreign matter which may adhere to said cogs. The cogs are retracted upon the upper portion of the wheel and are projected at the lower portion so as to penetrate the surface of the ground over which the traction wheel may pass and prevent slipping thereof, the retracting of the cogs at the upper portion of the wheel preventing interference of the projecting portions with any part of the machine, as well as serving to clear the cogs of obstructing matter.

The projecting track 5 is mounted so as to be thrown into the path of the arms 4 or out of the path thereof and may be mounted upon any convenient portion of the engine, as, for instance, the axle 6. The movable projecting track 5 is provided with a rack bar 7 mounted in a frame 8 vertically adjustable with reference to the axle 6. A guide 9 is secured to the lower portion of the frame 8 and receives the rack bar 7 and sustains the strain incident to upward pressure of the arms 4 against the track 5 when the cogs are projected and penetrating the surface of the ground over which the traction wheel may pass.

A pinion 10 is in mesh with the teeth of the rack bar 7 and is fast upon a shaft 11 which is journaled to the frame 8 and provided at one end with a crank arm 12. An operating lever 13 is suitably connected by means of a rod 14 with the crank arm 12 and is adapted to be actuated so as to move the track 5 either to project the same into or out of the path of the arms 4. To reduce the friction between the arms 4 and track 5 to the smallest amount possible, rollers 15 are fitted to the outer ends of the arms 4 and are arranged to bear against the said track. To give stability to the structure and to brace the arms 4, plates or bars 16 are firmly attached to convenient portions of the traction wheel, and each has a slot 17 through which the arm 4 of the proximal cog 2 passes. The slots 17 are of a length approximating the amplitude of movement of the cogs. A spring 18 is arranged at one side of each of the slots 17 and exerts a pressure upon the arm 4 passing through the slot so as to hold said arm and the coöperating cog in the adjusted position.

The frame 8 is forked or comprises spaced portions which embrace opposite sides of the axle 6 and enter seats formed therein so as to prevent any movement of the frame upon the axle in the length thereof. To effect vertical adjustment of the frame 8, adjusting screw 19 is mounted therein and has screw thread connection with a nut 20 fitted to said frame, the lower end of the screw being connected with the axle by means of a swivel joint, whereby in the rotation of the set screw the frame 8 will be moved vertically either up or down according to the direction of rotation of the set screw. In order to determine the relative position of the frame 8 and the distance of projection of the cogs 2, a pointer 21 applied to or forming a part of said frame coöperates with scale graduations 22 applied to the axle 6.

The retracting track 23 is fast to the axle 6 or other part of the machine supporting the cog actuating mechanism and normally extends in the path of the arms 4 so as to successively engage therewith and move the cogs 2 inward in the rotation of the wheel. The retracting track preferably consists of a stout rod or bar firmly attached to the axle or like supporting part and having its end portions bent into the form of a loop, which embraces end portions of the projecting track. Inasmuch as the cogs or their arms 4 bear a fixed relation to the retracting track, there is no occasion for mounting said track in a movable or adjustable manner. It is not always desirable to have the cogs project beyond the tread surface, hence the necessity of mounting the projecting track 5 so as to be withdrawn out of the path of the arms 4. Again, it may be necessary only to project the cogs a short distance from the tread surface of the wheel according to the condition of the ground or surface over which said wheel may travel, and to meet this condition the projecting track is adjustable vertically. When throwing the track 5 into the path of the arms 4, the arms of the lowermost cogs will come upon the upper or inner side of the track 5, and in order that said arms may clear the end portions of the track in the rotation of the wheel, it has been found expedient to have the end portions of the track hinged or movable, as indicated at 24, so that upon the upward movement of the cogs, their arms may clear the movable ends 24 of the track 5, said movable ends engaging with the arms upon their downward movement to cause them to engage with the outer or lower side of the track, whereby the cogs are projected.

The actuating mechanism for the cogs may be placed upon either side of the traction wheel, but for convenience it is preferred to locate the same upon the outer side of the wheel, and for this purpose the axle is extended.

Having thus described the invention, what is claimed as new is:

1. The combination with a traction wheel provided with movable cogs, of a track for moving said cogs, a support for said track, means for moving the track vertically for regulating the distance of projection of the cogs beyond the tread surface of the wheel, means for moving said track laterally into and out of operative relation with the cogs, and a stationary track adapted to retract said cogs.

2. In combination with a traction wheel provided with movable cogs, a track coöperating therewith, means for vertically adjusting said track, and other means for moving the track laterally into or out of the path of the cogs and the operating projections thereof.

3. In combination, a traction wheel provided with movable cogs, a track for coöperation with said cogs to effect operation thereof, a rack bar extended from said track, a toothed operating element in mesh with the teeth of the rack bar, and an operating lever having connection with said toothed element to admit of throwing the rack bar into and out of operative position.

4. In combination, a traction wheel provided with movable cogs, a fixed retracting track for withdrawing said cogs, a projecting track for throwing said cogs into operative position, a vertically adjustable frame having the projecting track connected therewith to admit of varying the distance of projection of the cogs beyond the tread surfaces, and other means coöperating with the projecting track and vertically adjustable frame to throw the projecting track into and out of the path of the aforesaid cogs or operating projections thereof.

5. In combination, a traction wheel provided with guides, cogs mounted in said guides, means for moving said cogs into or out of operative position, slotted plates, arms projected from the respective cogs and passed through the slots of said plates, and springs arranged at one side of said slots and exerting a pressure upon the arms of the cogs to hold the latter in a given position.

6. The combination with a traction wheel provided with movable cogs and an axle on which said wheel is journaled, of a track adapted to project said cogs, a support for said track movable longitudinally of the axle whereby to carry the track into and out of operative relation to the cogs, and means for raising or lowering said support on the axle whereby to vary the distance of projection of said cogs beyond the tread surface of the wheel.

7. The combination with a traction wheel provided with movable cogs and an axle on which said wheel is journaled, of a projecting track, a rack bar to which said track is connected, a support mounted upon the axle and carrying a toothed wheel meshing with said rack, means for revolving said wheel whereby to carry the track into and out of operative relation to the cogs, a nut carried by said support, and an adjustable screw working in said nut and adapted to work against a bearing on the axle whereby to raise or lower the support, as and for the purpose set forth.

8. In combination with a traction wheel provided with movable cogs and an axle on which said wheel is journaled, a track adapted to project said cogs, a rack to which said track is connected, a support for said rack, said support being provided with a gear wheel meshing in said rack, means for operating said gear wheel, the support being forked and embracing the axle and slidably mounted thereon in a vertical direction, and a screw working in said support and adapted to also work against a bearing on the axle whereby to raise and lower the support.

In testimony whereof I affix my signature in presence of two witnesses.

ISAIAH MITCHELL. [L. S.]

Witnesses:
CLEBERT DEROUEN,
T. J. PEDDES.